United States Patent [19]

McKnight

[11] Patent Number: 4,828,142

[45] Date of Patent: May 9, 1989

[54] CAPSULE RECTIFICATION APPARATUS

[75] Inventor: Hugh P. McKnight, Indianapolis, Ind.

[73] Assignee: Eli Lilly & Company, Indianapolis, Ind.

[21] Appl. No.: 82,308

[22] Filed: Aug. 6, 1987

Related U.S. Application Data

[62] Division of Ser. No. 822,129, Jan. 24, 1986, Pat. No. 4,721,230.

[51] Int. Cl.[4] .......................... B23Q 7/12; B65H 9/00

[52] U.S. Cl. .................................... 221/171; 221/173; 221/278

[58] Field of Search .......................... 221/278, 171–173

[56] References Cited

U.S. PATENT DOCUMENTS

| | | | |
|---|---|---|---|
| 2,890,557 | 6/1959 | Greer et al. | 53/281 |
| 3,323,155 | 6/1967 | Cooley et al. | 221/278 X |
| 3,466,842 | 9/1969 | Bailey . | |
| 3,613,861 | 10/1971 | Whitecar . | |
| 3,817,423 | 6/1974 | McKnight | 221/173 |
| 3,838,766 | 10/1974 | Wagers, Jr. et al. . | |
| 3,871,295 | 3/1975 | Ackley | 221/173 X |
| 3,917,055 | 11/1975 | Vandenberg et al. | 221/168 X |
| 3,931,884 | 1/1976 | Ackley | 101/40 X |
| 4,091,600 | 5/1978 | Itoh | 221/173 X |
| 4,363,573 | 12/1982 | Ginther | 221/278 X |
| 4,427,131 | 1/1984 | Facchini | 221/173 |

FOREIGN PATENT DOCUMENTS

| | | | |
|---|---|---|---|
| 0135372 | 8/1984 | European Pat. Off. . | |
| 1531968 | 11/1977 | Fed. Rep. of Germany | 221/171 |
| 831517 | 5/1981 | U.S.S.R. | 221/171 |

*Primary Examiner*—Joseph J. Rolla

*Assistant Examiner*—Mona C. Beegle

*Attorney, Agent, or Firm*—Barnes & Thornburg

[57] ABSTRACT

An apparatus for handling empty two-piece capsules includes a vertically reciprocating feeder which extracts capsules from a hopper and forms randomly ordered linear arrays. A horizontal row of capsules are fed by the feeder to key-shaped slots in a block below the feeder. A blade reciprocally positioned adjacent the wider portion of the key-shaped slots moves into the slot at about the middle of the capsule to turn the capsules so as to be partly positioned within the narrower portion of the key-shaped slot. Each capsule is then ejected by projectable pins into a channel where the capsules are pneumatically accelerated into a pair of mated receiving rings which separate the two halves of the capsule.

11 Claims, 4 Drawing Sheets

CAPSULE RECTIFICATION APPARATUS

This is a division of application Ser. No. 06/822,129 filed Jan. 24, 1986 now U.S. Pat. 4,721,230.

This invention relates to apparatus for handling medicinal capsules consisting of caps and bodies composed of gelatin which are telescopically assembled. More particularly, this invention relates to a mechanism which converts randomly oriented two-piece capsules to an ordered array of capsules all of which have the body portion oriented in the same direction.

Two-piece medicinal capsules have been used in the pharmaceutical industry for many years to define and contain a unit dose of a drug or medicine. The cap and body portions are telescopically assembled during their initial manufacture so as to permit easy handling. The empty capsules are subsequently disassembled for filling and reassembled subsequent to filling. The cap and body portions of empty capsules are made to sufficiently close tolerance that during normal handling the two portions of the capsules stay together yet are easily disassembled when necessary for filling.

In a capsule filling operation, batch loads of randomly oriented empty capsules are delivered to a capsule filling apparatus. The randomly oriented empty capsules must then be rectified so as to arrange all of the capsules with the body portion oriented in one direction and the cap portion oriented in the opposite direction. Thus oriented, the capsules can be deposited in a caPsule receiving means, which can take any of several forms. In the receiving means, the capsules are separated, the body portions filled, and the capsules reassembled.

In large capsule filling operations, very high-speed rotary capsule rectifiers are employed which can rectify capsules at a rate of more than 1,000 capsules per minute. On the other hand, smaller capsule filling operations have employed capsule rectifying devices which operate at comparatively slow rates of 90 to 130 capsules per minute.

One of the earliest mechanisms for rectifying two-piece hard capsules operating in this slower speed manner included a hopper for holding the empty capsules which oscillated back and forth. Stationary tubes were provided into which said capsules were funneled by the oscillating hopper. The capsules, which were randomly oriented with respect to the direction of the body section, were discharged from the tubes into a set of horizontally positioned fingers which, through a reciprocating movement, oriented the capsules so that the body section was always pointed in the same direction. The oriented capsules were then deposited in an appropriate receiving means.

In accordance with the present invention, the capsule handling apparatus includes a hopper for receiving capsules in a randomly oriented fashion which is fixed with respect to an underlying base. A feeding means is provided which communicates with the interior of the hopper fOr extricating at least one randomly ordered linear array of capsules. The feeding means preferably includes a plurality of channels for containing a plurality of adjacent linear arrays of capsules and is generally mounted for reciprocal movement vertically with respect to the hopper means.

The rectification which reorients each of the linear arrays of capsules from one of random order to one of uniform order is achieved by a slot means cooperating with a turning means and an ejecting means. The slot means includes a wider portion and a narrower portion so situated with respect to the feeding means as to receive capsules from the feeding means into the wider portion. The turning means turns the capsules within the slot means such that the body portion extends into the narrower portion of the slot means while the cap portion remains substantially within the wider portion. The ejecting means projects into the slot means to contact the cap portion of the capsules and eject the capsules from the slot means through the narrower portion thereof. A delivery means is provided for delivering the capsules ejected by the ejection means from the slot means to a receiving means situated adjacent to an output thereof.

The turning means preferably comprises a blade reciprocally mounted to project periodically from a position adjacent the wider portion of the slot means to a position at least partially within the narrower portion of the slot means. The ejecting means comprises pin means reciprocally mounted to project periodically from a position adjacent the wider portion of the slot means to a position at least partially within the narrower portion of the slot means, the end of the pin means contacting the cap portion of the capsule.

The feeding means generally includes a gate means for controlling the number of capsules delivered by the feeding means into the slot means. Similarly, the delivery means further includes means for accelerating the rate of delivery of oriented capsules to the adjacent receiving means. Preferably, the delivery means comprises a plurality of adjacent channels which converge toward the receiving means in such a manner that the spacing between capsules when received in the receiving means is much smaller than during rectification in the rectifying means.

In a preferred embodiment of the invention, the apparatus includes cam means for actuating the turning means and the ejecting means. The cam means can be mounted on a common shaft which is in turn coupled to the feeding means so as to coordinate the feeding and ejection of capsules to and from the rectifying means.

One feature of the present invention is the ejection of the capsules by the ejection means from the side of the slot means. This side ejection avoids a two-step turning process typically practiced in the prior art and thereby achieves a more reliable and efficient rectification of the capsules. Another feature of the present invention is the use of converging channels within the delivery means for delivering capsules from the rectifier at one spacing to a receiving means of another spacing. This converging channel delivery means permits the substitution of receiving means of various spacing to coordinate with capsules of various sizes.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

Figure 1:
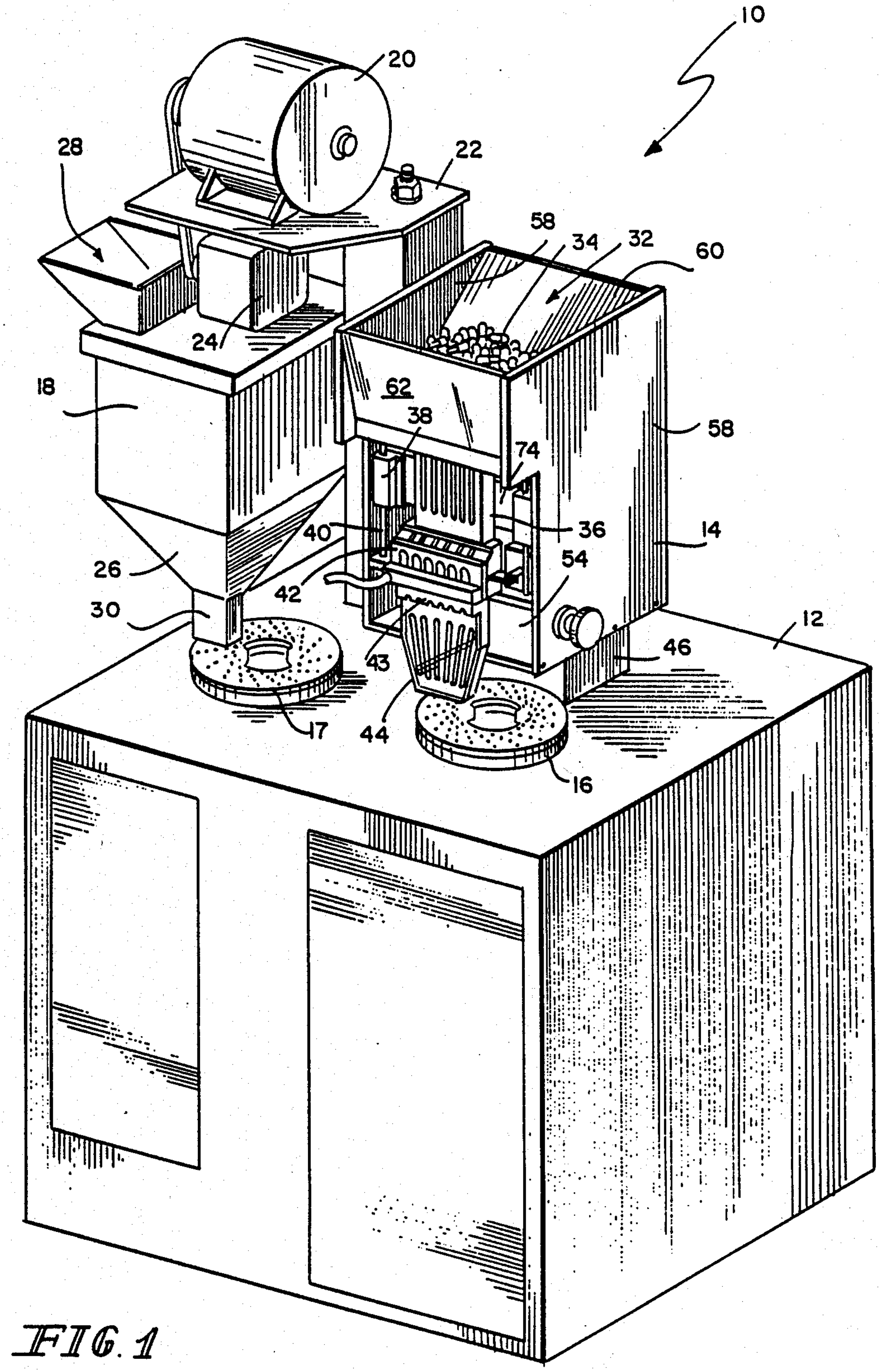
FIG. 1 is a perspective view of a capsule filling apparatus including the capsule handling apparatus of the present invention.

A capsule filling apparatus 10 is illustrated in FIG. 1 to include a base 12 on which is mounted a capsule handling apparatus 14 which dispenses capsules into ring-shaped receivers 16. A bottom portion 17 of a ring-shaped receiver 16 is shown positioned below a dispensing apparatus 18 which dispenses a drug or medicine into the Open body portions of the capsules within the receiving ring bottom portion 17. The dispensing apparatus also includes motor 20 mounted on top of fixed plate 22 which powers the dispensing apparatus through gearbox 24. The gearbox 24 contains gears for operating an auger mechanism (not shown) enclosed within hopper 26. The hopper 26 includes an input opening 28 and an output 30, which output is immediately above the receiving ring bottom plate 17. The dispensing apparatus forms no part of the present invention other than as illustrative of the preferred embodiment with which the capsule handling apParatus of the present invention is employed.

The capsule handling apparatus 14 includes a hopper 32 into which capsules 34 are deposited and assume a randomly oriented position. The hopper 32 can include a cover not illustrated to prevent unwanted materials from entering the capsule handling apparatus.

A feeder 36 communicates with the interior of the hopper 32 and extracts the capsules from the hopper. The feeder 36 includes bushings 38 engaging vertical rods 40 which permit a vertical reciprocation of the feeder 36 with respect to the hopper 32.

At the lower end of the feeder 36 is the rectifier 42 which reorients the randomly ordered array of capsules delivered by the feeder 36 to uniform order. The capsules are ejected by the rectifier 42 into delivery unit 44 with the aid of an air accelerator 43 which delivers the capsules to the rotating receiving rings 16.

Figures 2, 3:
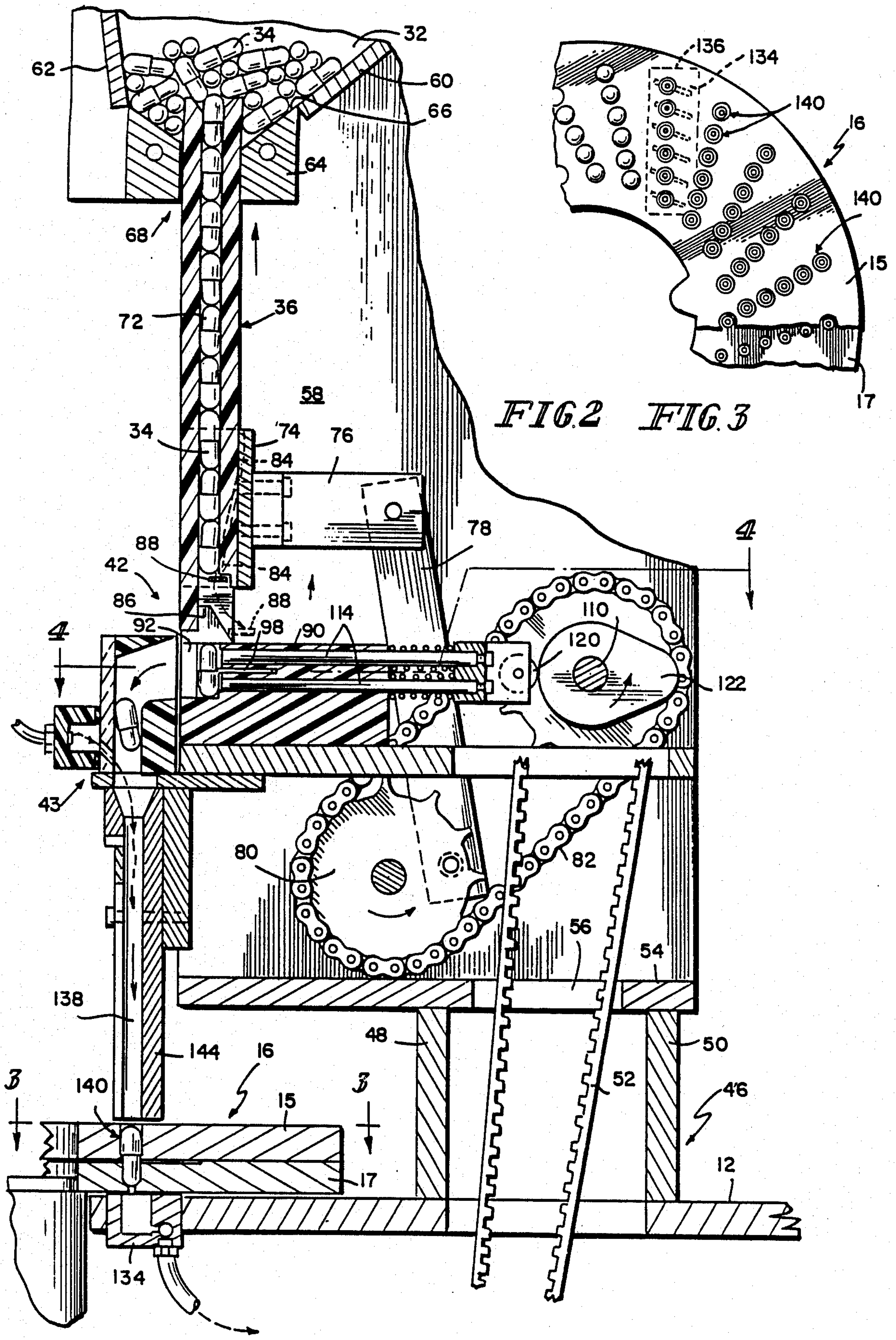
FIG. 2 is a sectional view of the apparatus shown in FIG. 1.
FIG. 3 is a sectional view of the apparatus taken along line 3—3 of FIG. 2.

The capsule handling apparatus 14 is mounted to the base 12 by an open box-shaped support unit 46 shown in FIG. 2 to include a front plate 48 and a back plate 50 which are fixed to the base 12. The support unit encloses a drive belt 52 for powering the capsule handling apparatus 14. The lower end of the drive belt 52 connects to a power source (not shown) within base unit 12.

The upper end of the support unit 46 is fixed to floor plate 54. The floor plate 54 includes a window 56 through which the drive belt 52 passes. The sides 58 of the capsule handling apparatus 14 are fixed to the floor plate 54 and extend upwardly therefrom to enclose substantially the remainder of the capsule handling apparatus. The upper portion of sides 58 define in part the hopper 32. The hopper 32 includes a sloping rear plate 60 and a nearly vertical front plate 62 as well as block 64 shown in section in FIG. 2.

The block 64 includes an upper surface 66 forming a V-shaped trough with a central slot-like opening 68. The opening 68 receives the vertically reciprocal feeder 36.

The feeder 36 includes a generally rectangular block 70 having a plurality of circular channels 72 extending vertically from the top to bottom of the block 70. The interior dimension of the channels 72 is such as will permit a linear array of capsules to be formed within the channel and fed downwardly therethrough by the influence of gravity alone. The block 70 is supported on each side by bushings 38 shown in FIG. 1 which are fixed to horizontal tie bar 74 shown in FIGS. 1 and 2. A rearwardly extending arm 76 is secured to the tie bar 74. The distal end of arm 76 is attached to connecting arm 78 which in turn is connected with toothed gear 80 driven by chain 82. The gear 80 and connecting rod 78 form a bell crank which causes the block 72 to reciprocate.

The lower end of lock 70 is provided with a gate 84 which is biased in such a manner as to prevent the downward flow of capsules 34 through channel 72. An inclined surface 86 is provided which interacts with contact piece 88 of the gate 84 when the block is in its lowermost position to open the gate 84 so as to permit the downward flow of capsules 34 through channel 72 into the rectifier 42.

Figure 4:
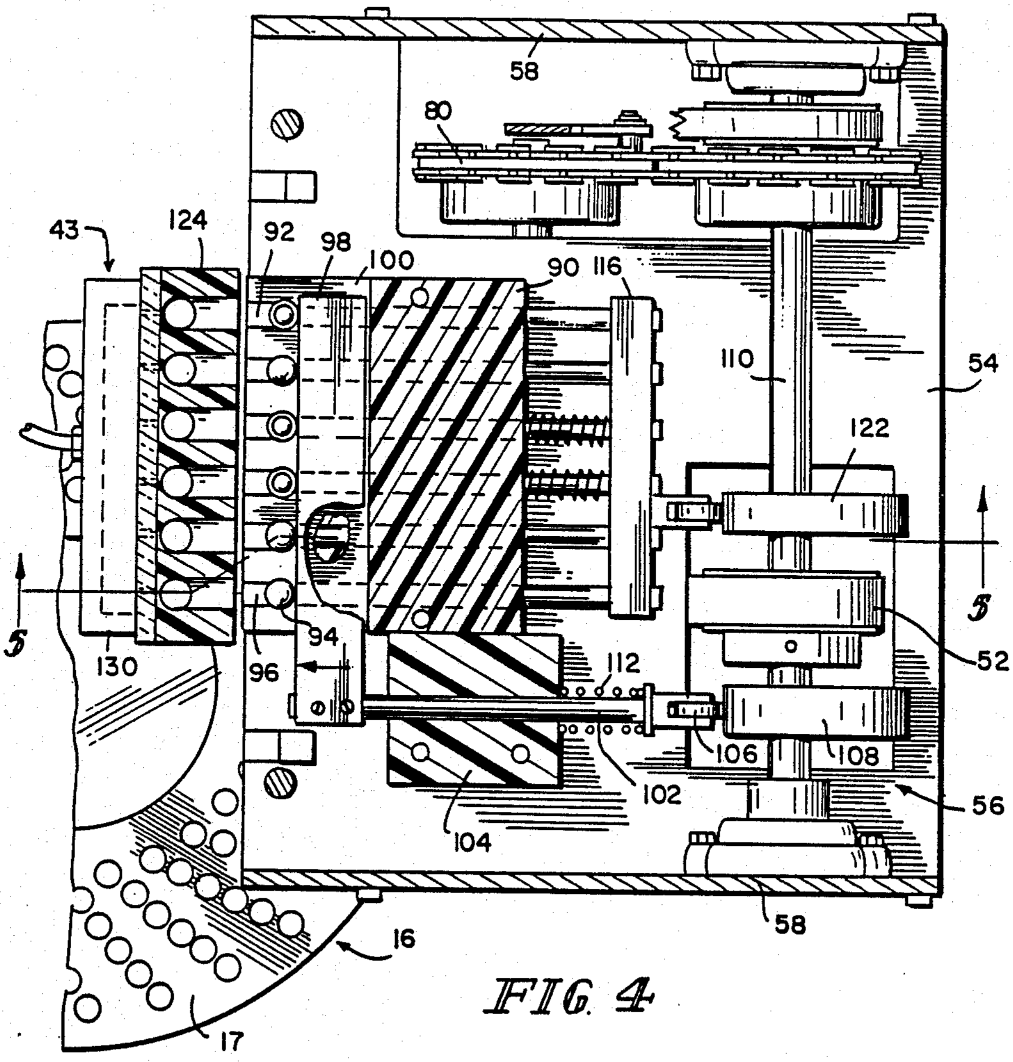
FIG. 4 is a sectional view of the apparatus taken along line 4—4 of FIG. 2.
Figure 5:
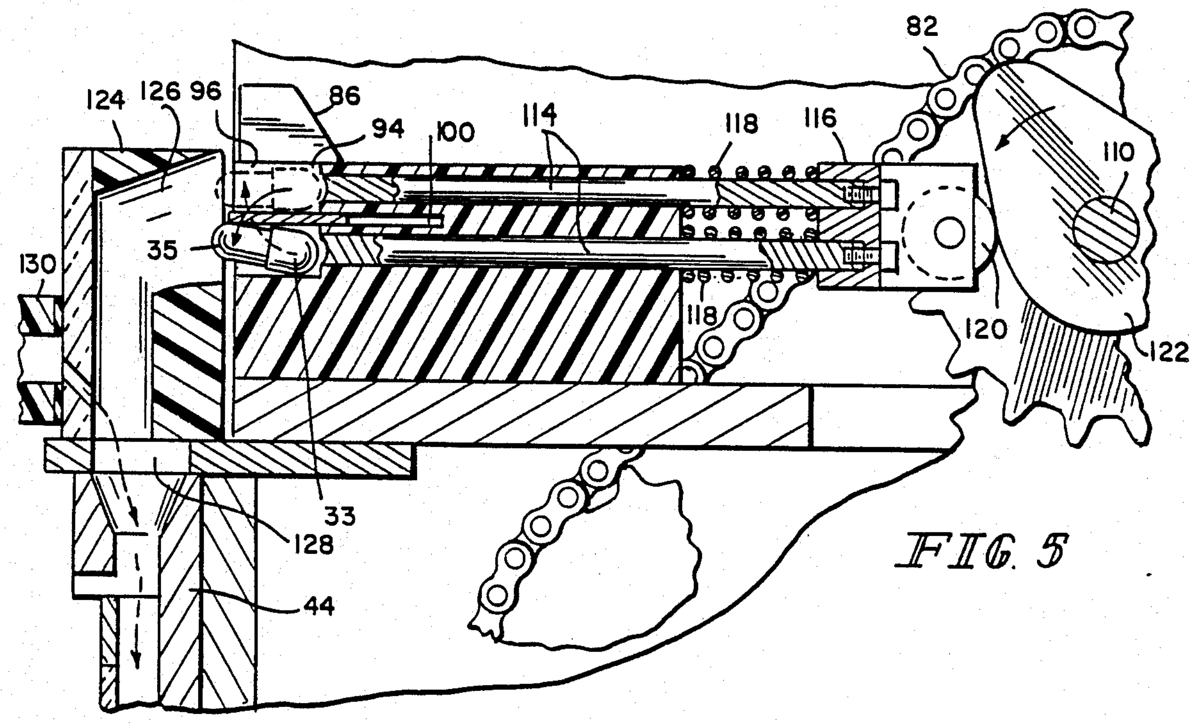
FIG. 5 is a sectional view of the apparatus taken along line 5—5 of FIG. 4.

The structure of the rectifier 42 is shown in FIGS. 2, 4, and 5 to comprise a rectifier body 90 including a plurality of keyhole-shaped slots 92. Each keyhole-shaped slot 92 includes a wider portion 94 and a narrower portion 96. The wider portion 94 of each slot 92 is situated directly below the vertical channel 72 of the feeder means 36 so as to receive capsules 34. The dimensions of the wider portion 94 of the slot 92 are such that the capsule is easily received merely under the influence of gravity acting on the capsule itself.

A turning blade 98 is situated in blade slot 100. The blade 98 is mounted fOr reciprocal movement on rod 102 which extends through bushing block 104. The rearward end of rod 102 includes a cam follower 106 which rides on turning blade cam 108. Cam 108 is fixed to rotate with drive shaft 110 which is in turn driven by drive belt 52. The rod 102 is biased toward a rearward position by spring 112 situated between bushing block 104 and cam follower 106. With the rod 102 in this rearward position, the blade 98 assumes a position within slot 100 immediately adjacent the wider portion 94 of slot 92 as shown in FIG. 4. As blade cam 108 rotates and the cam follower 106 moves from its rearward position shown in FIG. 4 to a more forward position, the blade 98 moves forward to the position shown in FIG. 5.

The forward motion of the blade causes a force to be placed on the side of the capsules 34 within the slot 92 approximately at the midpoint of the capsule. The capsule, under the influence of this force, is caused to rotate as shown in FIG. 5 such that the body portion 35 of the capsule is substantially wholly received within the narrower portion 96 of slot 92 while the cap portion 33 of the capsule remains substantially within the wider portion 94 of the slot 92. This action occurs due to the difference in frictional force experienced by the two portions of the capsule 33 and 35 by virtue of the frictional engagement of the walls of the narrower portion 96 of the slot 92.

Figure 7:
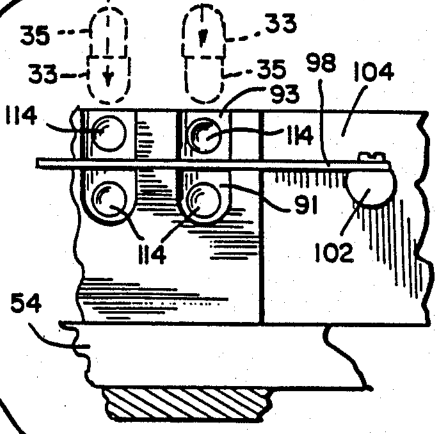
FIG. 7 is a sectional detail taken along line 7—7 of FIG. 6.

As seen in FIGS. 5 and 7, capsules which are originally received in slot 92 with the cap portion 33 in the downward position as shown on the left of FIG. 7 will be rotated to the position shown in solid line in FIG. 5 and thereby lie in the lower half 91 of the slot 92. On the other hand, capsules which are initially received in the slot 92 with the body portion 35 in the downward position as shown on the right of FIG. 7 will be rotated by blade 98 to the position shown in phantom in FIG. 5 so as to lie in the upper half 93 of the slot 92.

The rectifier also includes ejecting rods 114 which pass horizontally through body 90 to intercept both the upper and lower halves 93 and 91 of each of the slots 92. The ejecting rods 114 are tied together at their rearward end by tie block 116 and are biased toward a rearward position by biasing springs 118. A cam follower 120 rides on ejecting cam 122 which like blade cam 108 is fixed to drive shaft 110. As the ejecting cam 122 rotates from the position shown in FIG. 4 to the position shown in FIG. 5, the cam follower 120 and tie bar 116 are forced forward against the bias of biasing spring 118 causing the ejection rods 114 to project into both the upper and lower halves of slot 92 thereby causing the capsules 34 to be ejected from the slot 92 through the narrower portion 96 into manifold 124.

Figure 6:
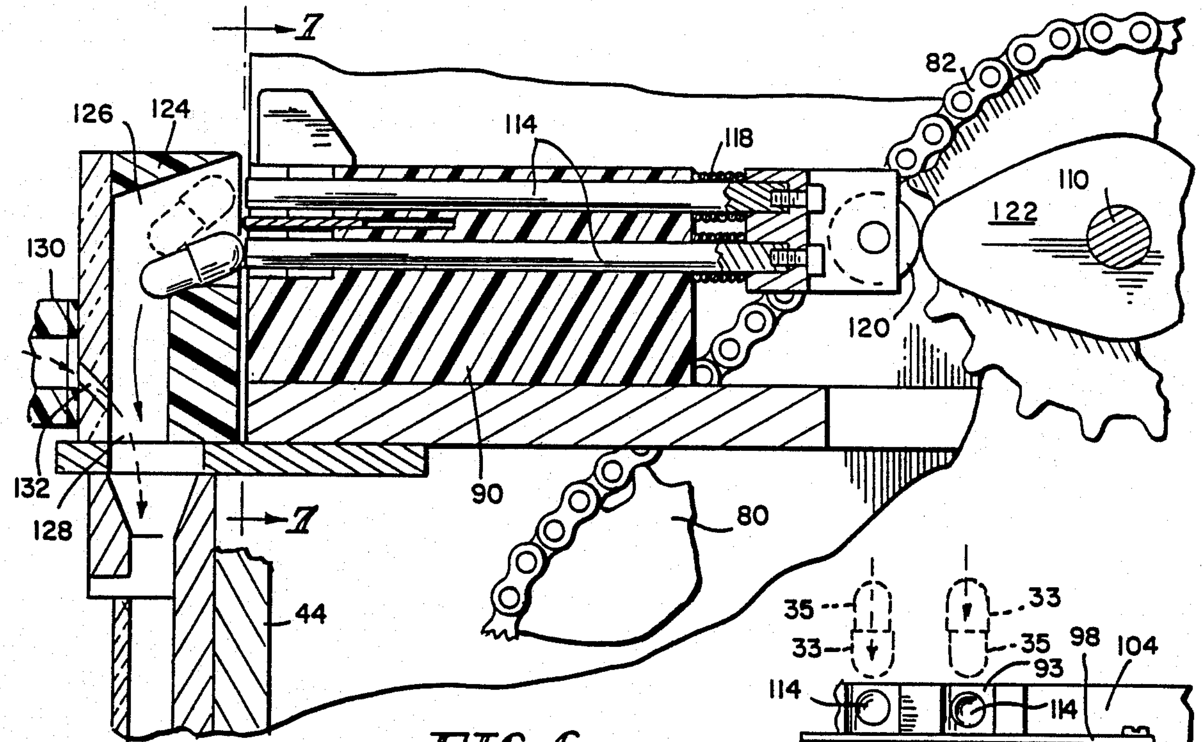
FIG. 6 is a sectional view similar to FIG. 5 showing the ejecting means in a different position.
Figure 8:
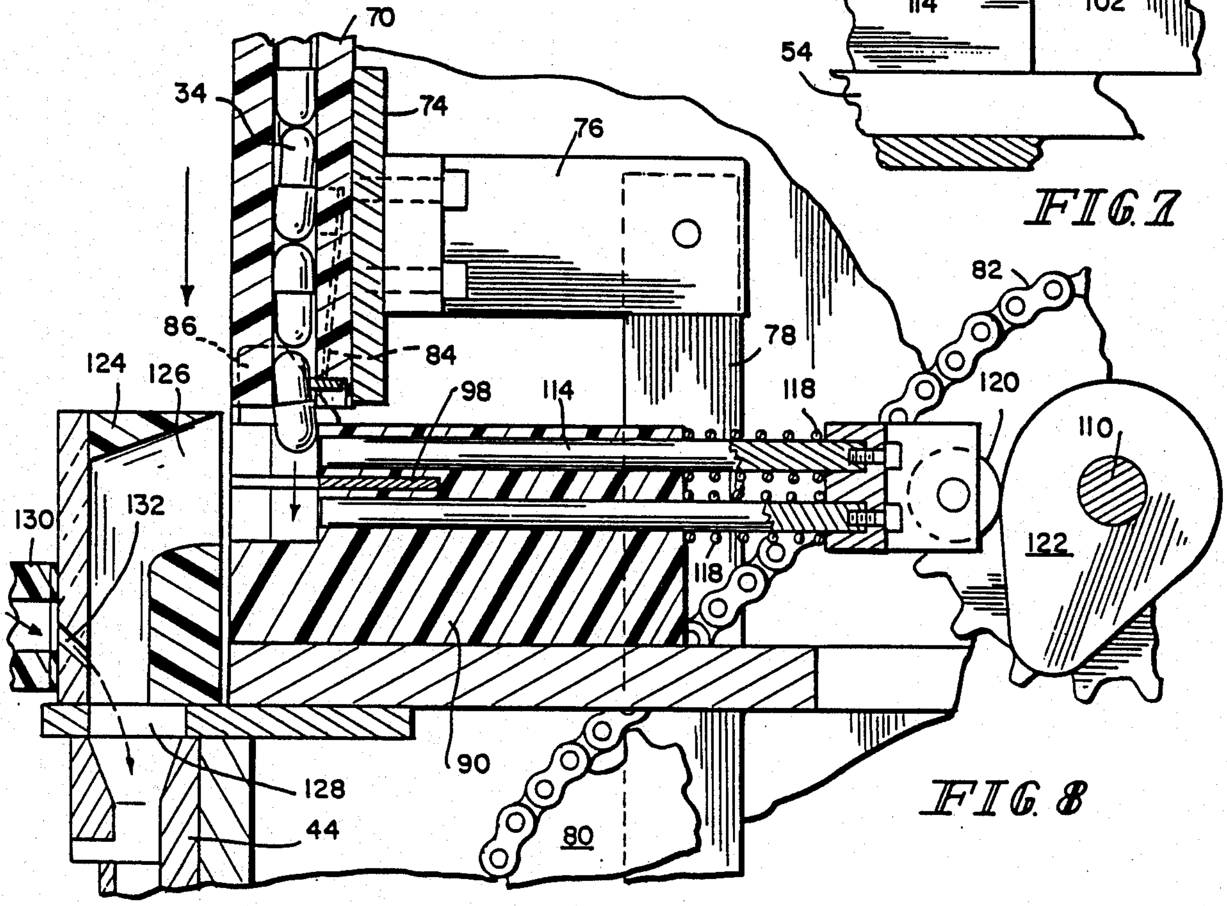
FIG. 8 is a sectional view similar to FIGS. 5 and 6 showing cooperation between the feeding means and the slot means.

As the ejecting cam 122 continues in its rotation from the position shown in FIG. 6 to that position shown in FIG. 8, the ejecting rods 114 are returned to their rearward position under the influence of the biasing springs 118. Simultaneously, the blade 98 also returns to its rearmost position. The drive shaft 110 has also caused chain 82 to move gear 80 to a position such that the delivery block 70 has descended to its lowermost position. A single capsule 34 is then delivered from the feeder channel 72 past gate 84 into each slot 92 to begin the process anew. The operation of the rectifier is best understood by considering the repeated operations illustrated in FIGS. 4, 5, and 7 as a continuously repeating process.

The manifold 124 includes a plurality of Γ-shaped channels 126 each of which is capable of receiving capsules from both the upper and lower halves of a single slot 92. The Γ-shaped channel acts to rotate the capsule from a position wherein the body portion 35 of each capsule 34 is facing forwardly to a position wherein the body portion 35 of each capsule 34 is facing downwardly. The lower end 128 of each channel 126 communicates directly with delivery unit 44.

An accelerating means 43 is provided for speeding the delivery of the capsules in their new orientation from channels 126 to the ring-shaped receivers 16. The accelerating means 43 comprises a manifold 130 which is connected to a source of pressurized air (not shown) of about 5 pounds above ambient atmospheric pressure. A downwardly inclined hole 132 leads from the manifold 130 to each of the channels 126, the hole 132 being situated such that air escaping from the manifold 130 through hole 132 is directed downwardly toward the lower end 128 of each channel 126. The escaping air through hole 132 causes a general downward flow of air throughout channel 126 and into delivery unit 44 which accelerates the capsules 32 from the rectifier toward the receiving rings 16.

As shown in FIGS. 2 and 3, a vacuum manifold 134 is situated below receiving discs 16 and is connected to a source of vacuum (not shown). The vacuum manifold 134 includes a series of slotted holes 136 arranged beneath the series of holes in the receiving rings 16. The vacuum in the manifold 134 operates in conjunction with the pressure in manifold 130 to create a downward draft throughout the length of the channels 138 of the delivery unit 44.

Thus, as the capsules 34 are ejected from slot 92 by the ejection rods 114 as shown in FIG. 6, they are quickly pneumatically accelerated into the awaiting apertures 140 of the receiving ring 16. The cap portion 33 of the capsule 34 is retained by the top portion 15 of the receiver 16, while the body portion 35 of the capsule 34 is separated from the cap portion 33 and is retained in bottom portion 17 of the receiving ring 16.

As shown in FIG. 1, the channels 138 of the delivery unit 44 can be arranged to converge such that the spacing of the lower ends of the channels 138 can be arranged to match the spacing of the apertures 140 on the receiving plate 16, while the upper ends of channels 138 can be arranged to match the spacing of the channels 126 of manifold 124.

Although the invention has been described in detail with reference to the illustrated preferred embodiments, variation and modifications exist within the scope and spirit of the invention as described and as defined in the following claims.

What is claimed is:

1. Apparatus for handling capsules having a body portion and a cap portion to position the capsules within a receiving means in a uniform orientation comprising: hopper means for containing capsules in a randomly oriented manner, feeding means communicating with the interior of the hopper means for extracting at least one randomly ordered linear array of capsules, slot means including a wider portion and a narrower portion situated to receive capsules from the feeding means into the wider portion, turning means for turning the capsules within the slot means such that the body portion extends into the narrower portion of the slot means while the cap portion remains substantially within the wider portion, pin means reciprocally mounted to provide relative movement with respect to the turning means and to project periodically from a position adjacent the wider portion of the slot means to a position at least partially within the narrower portion of the slot means for ejecting the capsules from the slot means through the narrower portion thereof, and delivery means independent of the ejecting means for delivering the capsules ejected by the ejecting means from the slot means to a receiving means situated adjacent to an output thereof, the delivery means including a pneumatic source situated between the ejecting means and the receiving means for accelerating the rate of delivery of the capsules therebetween.

2. The apparatus of claim 1 wherein the feeding means includes a plurality of channels for containing a plurality of adjacent linear arrays of capsules.

3. The apparatus of claim 1 wherein the feeding means includes gate means for controlling the number of capsules delivered by the feeding means into the slot means.

4. The apparatus of claim 1 wherein the turning means comprises a blade reciprocally mounted to Project periodically from a position adjacent the wider portion of the slot means to a position at least partially within the narrower portion of the slot means.

5. The apparatus of claim 1 further comprising cam means for actuating the turning means and the ejecting means.

6. The apparatus of claim 1 wherein the feeding means is mounted for reciprocation between the hopper means and the slot means.

7. The apparatus of claim 1 wherein the delivery means comprises a plurality of adjacent channels which converge toward the receiving means.

8. The apparatus of claim 1 further comprising manifold means for directing capsules ejected by the ejecting means into the delivery means.

9. The apparatus of claim 1 further comprising a vacuum manifold situated below the receiving means for withdrawing air introduced by the pneumatic source.

10. The apparatus of claim 1 wherein the pneumatic source comprises at least one downwardly inclined hole for admitting air into the delivery means in an amount sufficient to accelerate the capsules from the ejecting means toward the receiving means.

11. The apparatus of claim 10 wherein the air admitted through the at least one dowmwardly inclined hole is about five pounds above ambient atmospheric pressure.

* * * * *